US012202721B2

(12) United States Patent
Heilveil

(10) Patent No.: US 12,202,721 B2
(45) Date of Patent: Jan. 21, 2025

(54) WATER DISPENSER

(71) Applicant: Peter S. Heilveil, Paranaque (PH)

(72) Inventor: Peter S. Heilveil, Paranaque (PH)

( * ) Notice: Subject to any disclaimer, the term of this patent is extended or adjusted under 35 U.S.C. 154(b) by 0 days.

(21) Appl. No.: 18/094,941

(22) Filed: Jan. 9, 2023

(65) Prior Publication Data

US 2023/0234830 A1 Jul. 27, 2023

Related U.S. Application Data

(60) Provisional application No. 63/297,399, filed on Jan. 7, 2022.

(51) Int. Cl.
*B67D 3/00* (2006.01)

(52) U.S. Cl.
CPC ......... *B67D 3/0003* (2013.01); *B67D 3/0038* (2013.01); *B67D 3/0061* (2013.01); *B67D 2210/0001* (2013.01)

(58) Field of Classification Search
CPC .. B67D 3/0003; B67D 3/0038; B67D 3/0061; B67D 2210/0001
See application file for complete search history.

(56) References Cited

U.S. PATENT DOCUMENTS

| | | | | |
|---|---|---|---|---|
| 5,405,526 A * | 4/1995 | Sutera | C02F 1/76 210/474 |
| 5,486,285 A * | 1/1996 | Feeney | B67D 3/00 210/85 |
| 6,418,742 B1 * | 7/2002 | Chaney | B67D 1/0861 62/391 |
| 7,014,759 B2 * | 3/2006 | Radford | C02F 1/003 141/330 |
| 7,882,705 B2 * | 2/2011 | Flax | B67D 3/0029 62/3.64 |
| 8,991,652 B2 * | 3/2015 | Harrod | B67D 3/04 222/145.5 |
| 9,216,894 B2 * | 12/2015 | Sasaki | C02F 1/003 |
| 10,287,153 B1 * | 5/2019 | Langiano | F16K 5/06 |
| 2002/0092813 A1 * | 7/2002 | Radford | C02F 1/003 210/473 |
| 2004/0134932 A1 * | 7/2004 | Lobdell | B67D 3/0029 222/189.06 |
| 2019/0107319 A1 * | 4/2019 | Flaks | B67D 3/0038 |

* cited by examiner

*Primary Examiner* — Frederick C Nicolas
(74) *Attorney, Agent, or Firm* — Nikitas E. Nicolakis; Lombard & Geliebter LLP

(57) ABSTRACT

A water dispenser is provided that includes an upper chamber for receiving liquid, a triptych-layer filtering assembly operably coupled to the upper chamber, a lower chamber operably coupled to the triptych-layer filtering assembly for dispensing filtered liquid, and a float assembly system. In one embodiment, the float assembly is operably coupled to the upper and lower chambers. The float assembly system may include a float body, a float valve and a float seal.

3 Claims, 17 Drawing Sheets

WATER DISPENSER

RELATED APPLICATION

This application claims priority to U.S. Provisional Patent Application No. 63/297,399 filed Jan. 7, 2022, entitled "WATER DISPENSER", which is hereby incorporated by reference in its entirety.

BACKGROUND OF THE INVENTION

The present application relates to water dispensers and more particularly containers for dispensing filtered water.

A variety of water dispensers have been designed, but each prior design has its drawbacks. There is therefore a need for a container for dispensing water that overcomes some or all the drawbacks associated with prior water dispensers.

SUMMARY

In one aspect, water dispenser is provided that includes an upper chamber for receiving an unfiltered liquid, the upper chamber having an aperture at a bottom thereof for the liquid to be filtered to pass through the aperture; a multiple-layer filtering assembly operably coupled to the upper chamber and in communication with the aperture for the unfiltered liquid to pass through an aperture in the filter assembly; a lower chamber operably coupled to the multiple-layer filtering assembly for receiving filtered liquid therefrom through the aperture in the filter assembly; and a float assembly system operably coupled between the upper and lower chambers, the float assembly system including a float body configured to open and close the aperture in the filter assembly depending on a level of the filtered liquid in the lower chamber.

In one embodiment, the float assembly system comprises a float value that automatically opens when the water level in the lower chamber reaches a predetermined level.

In one embodiment, the float assembly system resumes water flow through the multiple-layer filtering assembly upon withdrawal of liquid from the lower chamber.

In one embodiment, the float assembly system lifts upon rising water levels in the lower chamber causing a float seal to contact the float valve and preventing overflow of the lower chamber.

DETAILED DESCRIPTION OF THE INVENTION

The present application provides a novel water dispenser for dispensing filtered water. The water dispenser according to a preferred embodiment includes the elements listed herein and as shown in FIGS. 1-18.

Figure 1:
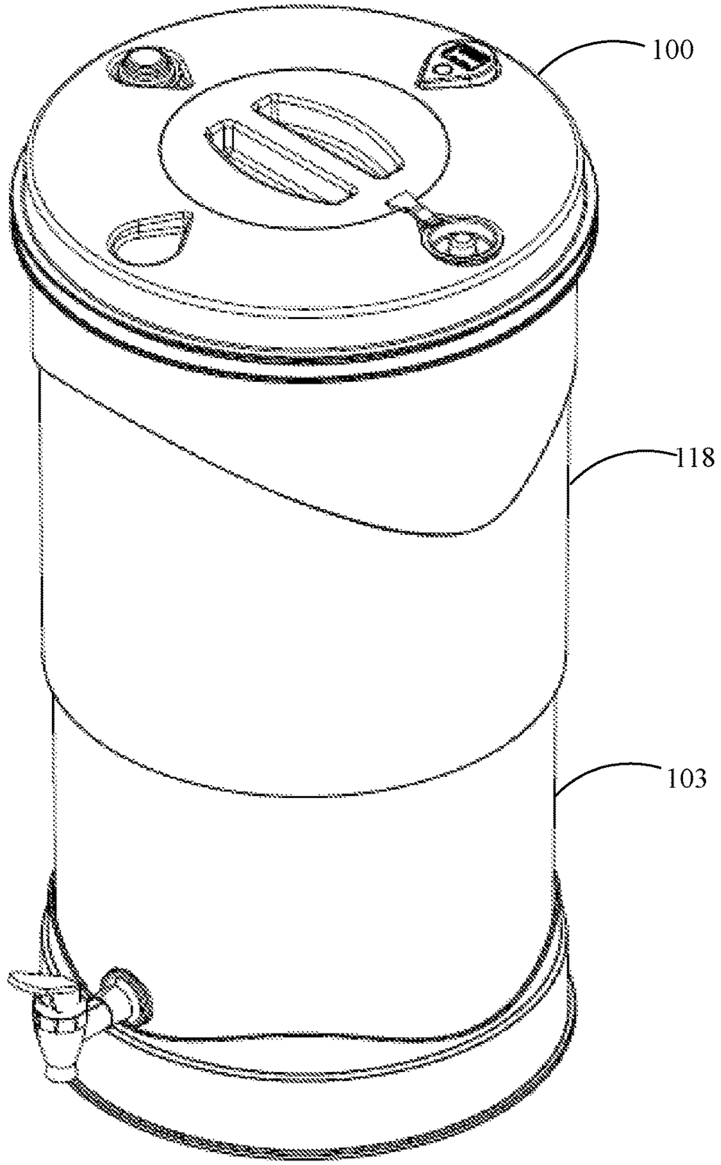
FIG. 1 is a perspective view of a water dispenser according to one embodiment of the dispensers disclosed herein.

FIG. 1 is a perspective view of a water dispenser 100 according to one embodiment of the dispensers disclosed herein. The dispenser 100 generally includes a bottom tank 103 and a top tank 118. The top tank 118 has an aperture therein that interfaces with a filter assembly. Water to be filtered is deposited in the top tank 118, gravity causes the water to pass through the aperture and then through the filter assembly, which removes contaminants from the water. The filtered water is stored in the bottom tank 103, which has a spout therein for dispensing the water. The tanks are preferably removably attached to each other, such that the filter assembly is sandwiched between the two tanks. The filter assembly may be removably attached to the bottom of the top tank 118, as shown. Various attachment methods may be used to attach the filter assembly to the bottom tank, including with filter clamps 113 as shown in FIGS. 1-14 and/or with a soft seal assembly as shown in FIGS. 15-19.

One other feature of this dispenser may include a design in which the top tank is larger than the bottom tank. The use of the float valve (/hydrophobic vent system) allows for a larger top reservoir so as to ensure the bottom tank stays full as much as possible, due to it starting to refill most every time water is withdrawn from the bottom tank since there is still more water in the top (10 liters top vs 6 liters bottom in one embodiment). Other designs tend to make their top tanks smaller than the bottom as they don't have a means of preventing overflow when the bottom tank gets filled and hence, they overflow and flood if the top tank is larger. Also, the bottom tank may telescopically fit fully within the top tank in packed mode (FIG. 4) so as to greatly reduce the shipping and storage requirements.

Figure 2:
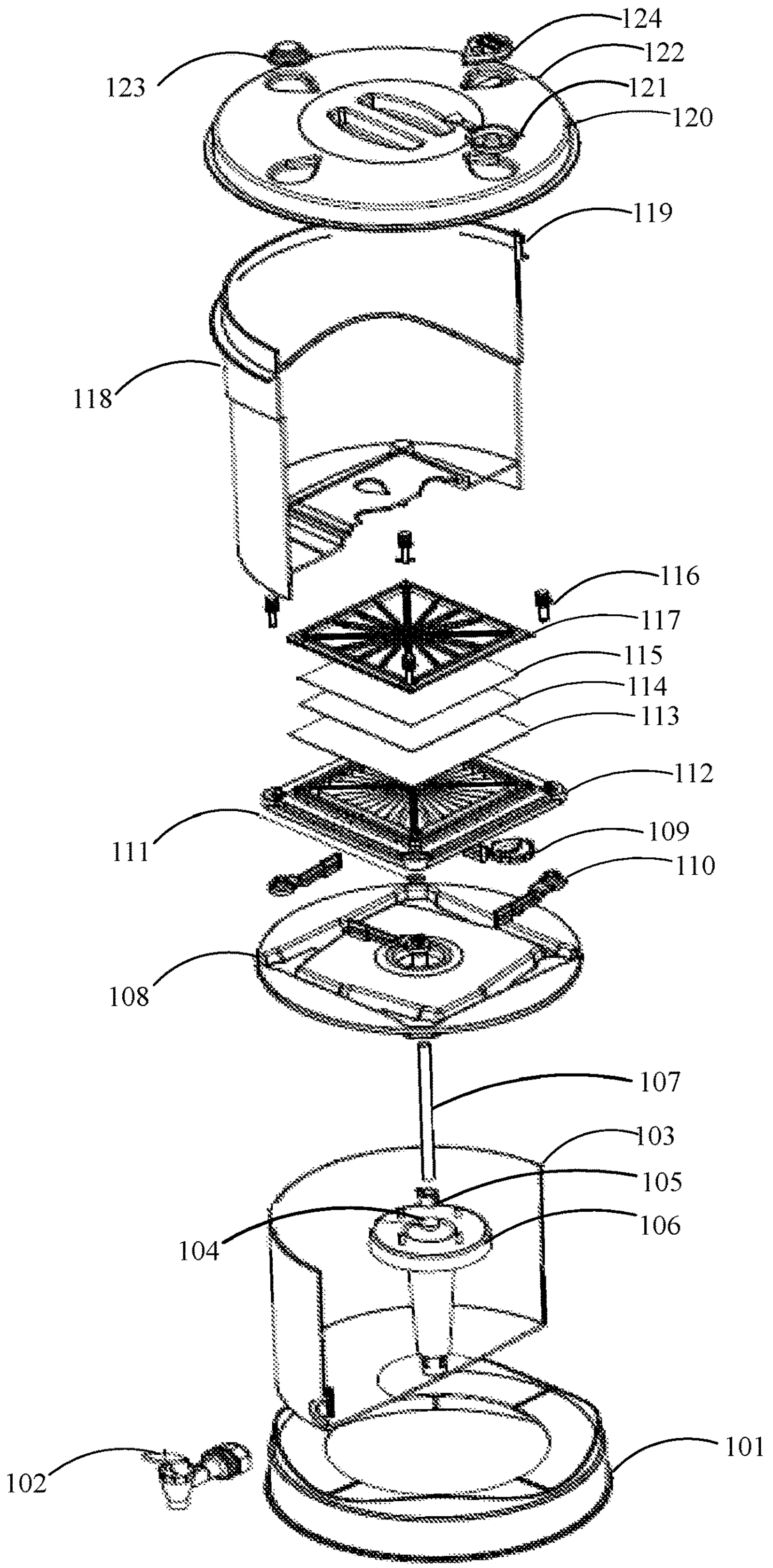
FIG. 2 is an exploded view of a water dispenser according to one embodiment of the dispensers disclosed herein.
Figure 11:
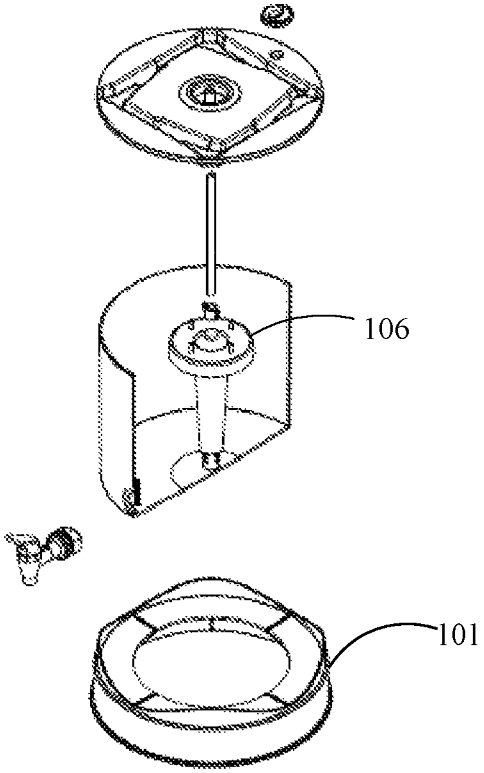
FIG. 11 is an exploded view of the bottom tank and stand of a water dispenser according to one embodiment of the dispensers disclosed herein.
Figure 12:
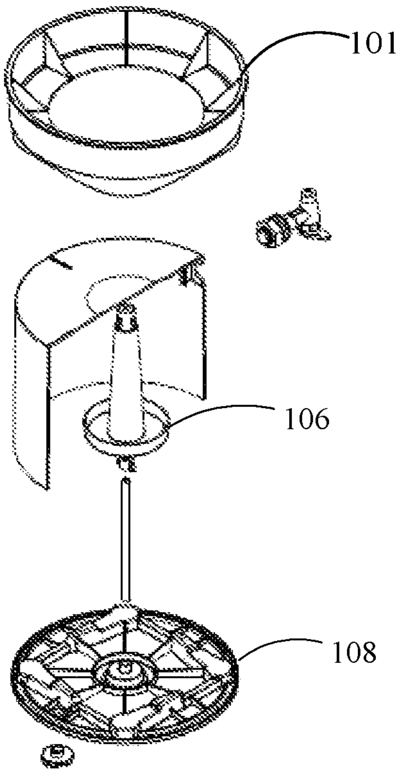
FIG. 12 is an exploded view of the bottom tank and stand of a water dispenser according to one embodiment of the dispensers disclosed herein.

FIG. 2 is an exploded view of a water dispenser 100 according to one embodiment of the dispensers disclosed herein. In one embodiment, the dispenser includes a float valve system (e.g., a float body, float valve and float seal, as shown in FIGS. 11-13) that regulates the water level in the bottom tank 103. The Float Valve 105 automatically opens when the water level in the bottom tank 103 is lowered due to water being withdrawn via the Spigot 102. This allows water from the top tank 118 to resume flow through the filters 113/114/115 into the bottom tank 103. When sufficient water has flowed to refill the bottom tank 103, the rising water level lifts the Float 106 which causes the Float Seal 104 to come into contact with the Float Valve 105 thereby shutting off flow of water from the top tank 118, preventing overfilling of the bottom tank 103. A commensurate means of allowing air to flow into and out of the sealed bottom tank 103 is required when it is being filled or drained in order to equalize pressure without allowing airborne pathogens to enter the bottom tank 103. This is accomplished by the use of a hydrophobic vent.

FIG. 2 further illustrates the components of the water dispenser according to one embodiment. As depicted, stand 1 provides a stable base for dispenser 100. The spigot 102 may include nuts and washers while providing for a means for dispensing of purified water. Bottom tank 103 may be sealed for storage of purified water. A float seal 104 may act as a seal for a valve to control water level in the bottom tank 103. A float valve 105 may include a valve for controlling water level in the bottom tank 103. The general float mechanism 106 further controls water level in the bottom tank 103. According to one embodiment, siphon tube 107 may improve water flow through filters by increasing functional head. The bottom tank cover 108 seals the bottom tank 103 and incorporates float assembly 104, 105, 106, along with siphon tube 107 passing through a hole in the seal 108 (as shown in FIGS. 4*b*-4*c*. A hydrophobic vent 109 allows for passage of clean air into/out of bottom tank 103. Cam handles 110 provide clamping pressure and locking of filter clamp. A washer 111 may prevent leakage of clean water between top and bottom tanks. A filter clamp 112 may hold filters in place and provide clamping pressure. Nanotech filter 113 may remove all listed contaminants from raw water. A carbon prefilter 114 may extend the life of nanotech filter 113 by providing additional NOM removal capacity. A sediment prefilter 115 may extend the life of a nanotech filter by providing additional sediment removal capacity. In one embodiment, a fastener is a fixture for cam handles to act against and to provide clamping pressure. The filter frame 117 is a mounting point for pre filters. The top tank 118 provides storage of raw water for purification. The magnet 119 for the counter may activate the counter to keep track of top tank filling cycles. In one embodiment, the top tank cover 120 provides cover for top tank and mounting for counter and storage for siphon and spigot caps. According to one embodiment, the splash guard 121 protects counters from splashed water damage. The spigot cap 122 may prevent entry of contaminants to the bottom tank when not in use. The Siphon cap 123 may prevent entry of contaminants to the bottom tank when not in use. Counter 124 may keep track of top tank filling cycles for monitoring filter life.

In one embodiment, a hydrophobic vent that employs a membrane that will let air pass through, but does not allow microbes or water to pass, may be used without a float system. The membrane, being hydrophobic, doesn't let water pass through, which thereby stops water flow from top to bottom when the bottom tank is full, without leaking. That is, the vent is "closed" by the water contacting and occluding the bottom surface of the hydrophobic membrane and then "opened" again when water is drawn out of the lower tank and air can again flow through.

Figure 3:
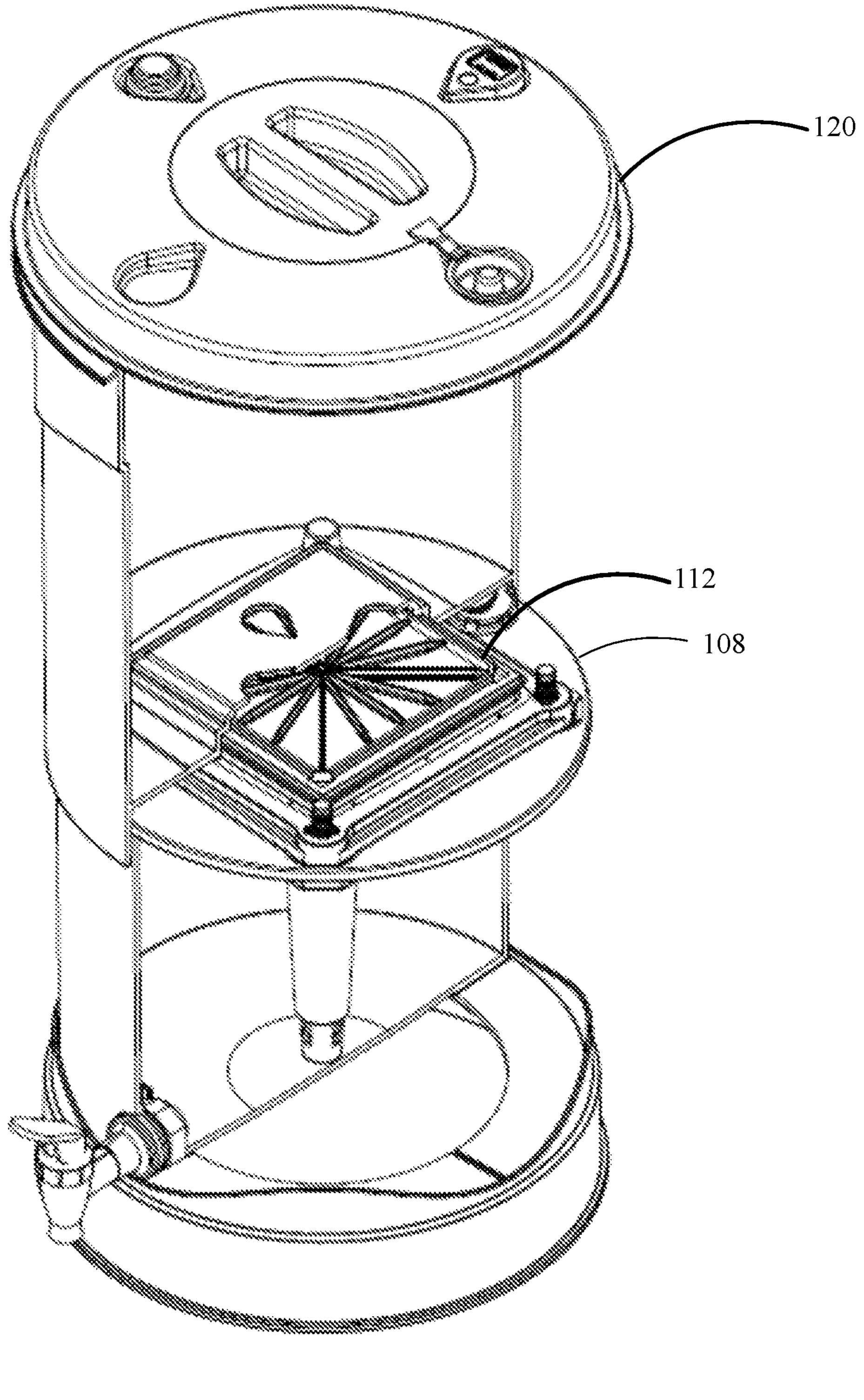
FIG. 3 is a cross sectional view of a water dispenser according to one embodiment of the dispensers disclosed herein.

FIG. 3 is a cross sectional view of a water dispenser according to one embodiment of the dispensers disclosed herein. The dispenser illustrated in FIG. 3 includes, inter alia, the top tank cover 120, the filter clamp 112 and the tank cover 108.

Figure 4A:
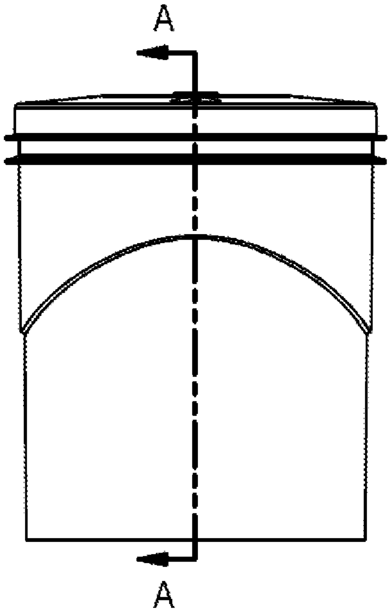
FIG. 4*a* is a side view of a water dispenser according to one embodiment of the dispensers disclosed herein in packed form.
Figure 4B:
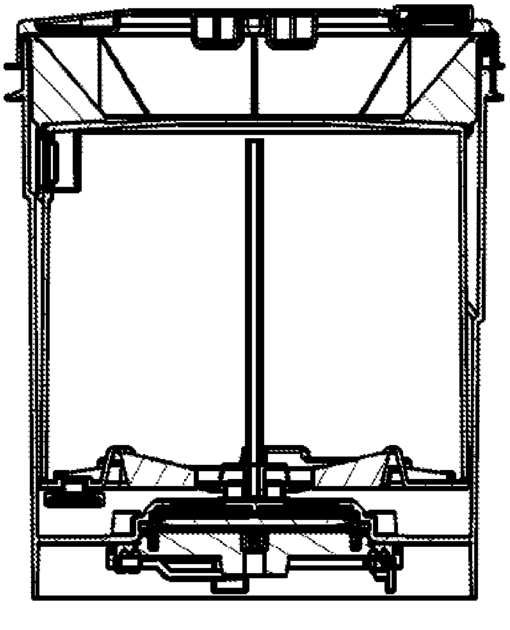
FIG. 4*b* is a cross sectional view of a water dispenser according to one embodiment of the dispensers disclosed herein in packed form.
Figure 4C:
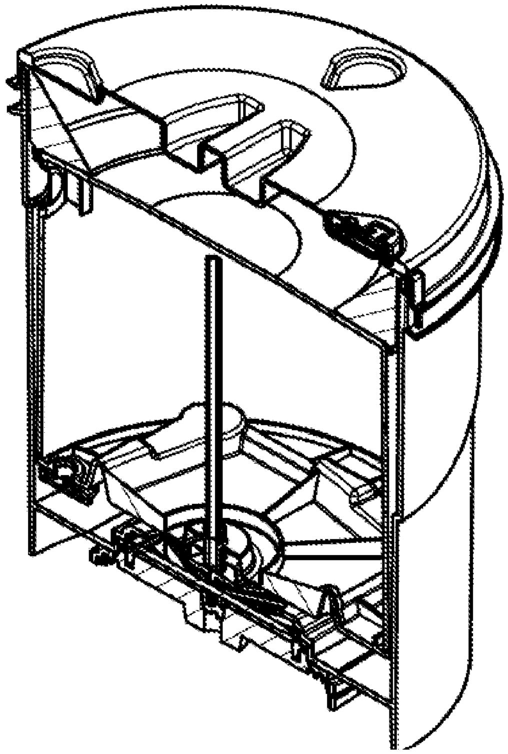
FIG. 4*c* is a cross sectional view of a water dispenser according to one embodiment of the dispensers disclosed herein in packed form.

FIG. 4*a-c* are cross-sectional views of a water dispenser according to one embodiment of the dispensers disclosed herein in packed form for shipping. The dispenser illustrated in FIG. 4*b-c* includes, inter alia, the top tank cover, the filter clamp and the tank cover, as well as the other components shown in the Figs. herein, packing in a compact form.

Figure 5A:
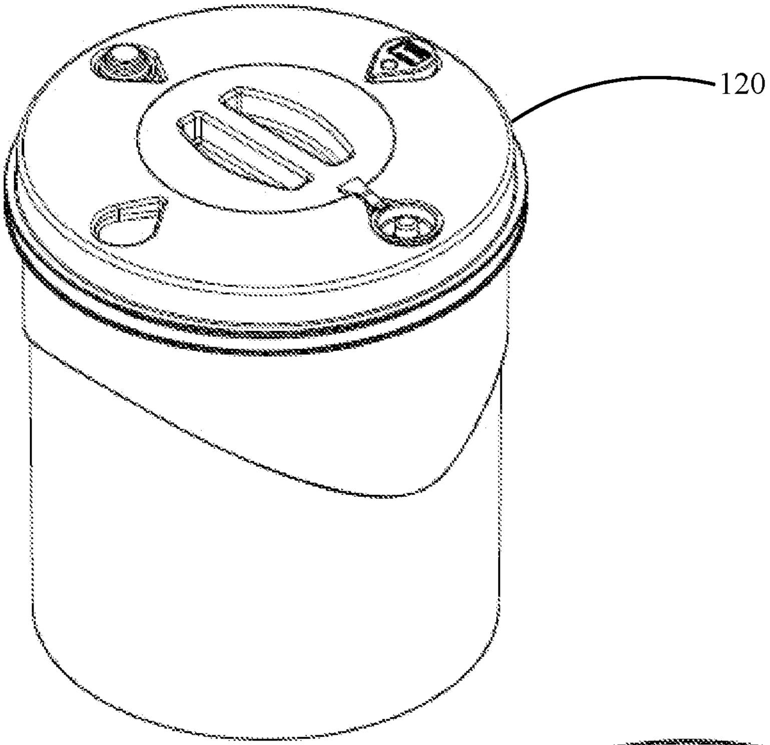
FIG. 5*a* is a partial disassembly of the top tank of a water dispenser according to one embodiment of the dispensers disclosed herein.
Figure 5B:
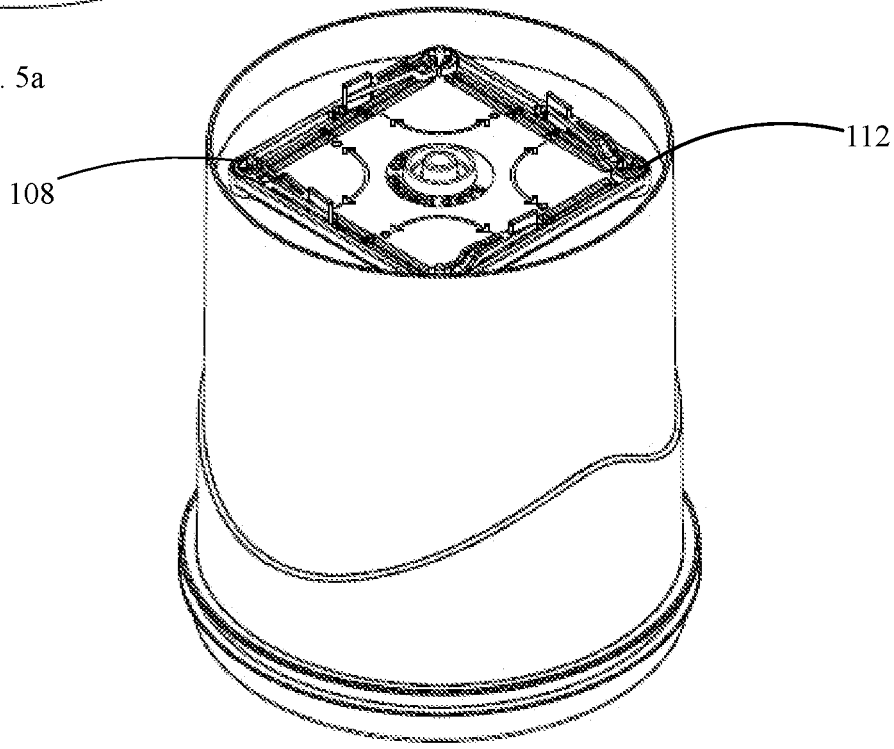
FIG. 5*b* is a partial disassembly of the top tank of a water dispenser according to one embodiment of the dispensers disclosed herein.

FIG. 5*a* is a partial disassembly of the top tank of a water dispenser according to one embodiment of the dispensers disclosed herein. The dispenser illustrated in FIG. 3 includes, inter alia, the top tank cover 120, splash guard which protects counter from splashed water damage, the spigot cap, siphon cap 123, and counter 124. FIG. 5*b* is a partial disassembly of the top tank of a water dispenser according to one embodiment of the dispensers disclosed herein. The dispenser illustrated in FIG. 5*b* includes, inter alia, the filter clamp 112 and the tank cover 108.

Figure 6A:
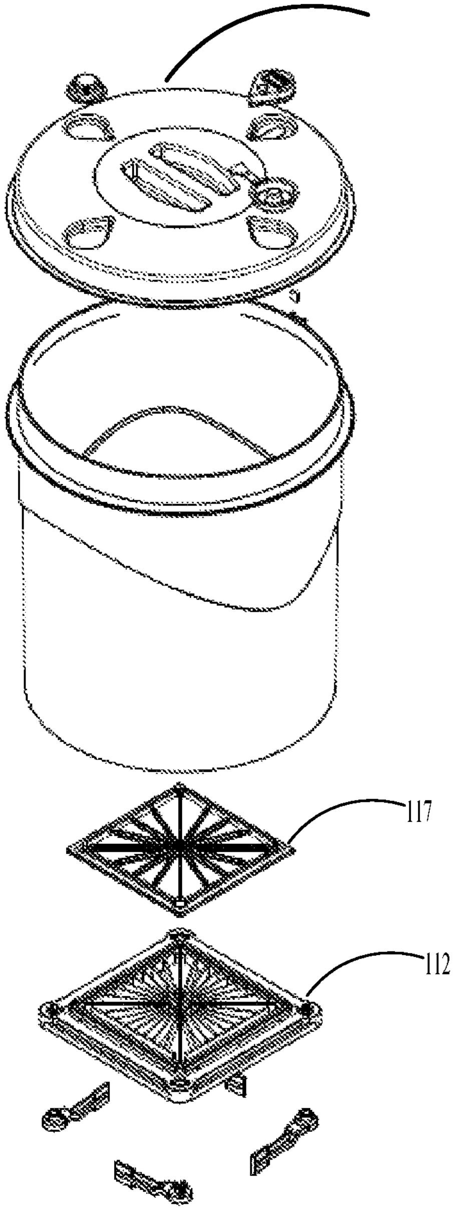
FIG. 6*a* is an exploded view of the top tank of a water dispenser according to one embodiment of the dispensers disclosed herein.
Figure 6B:
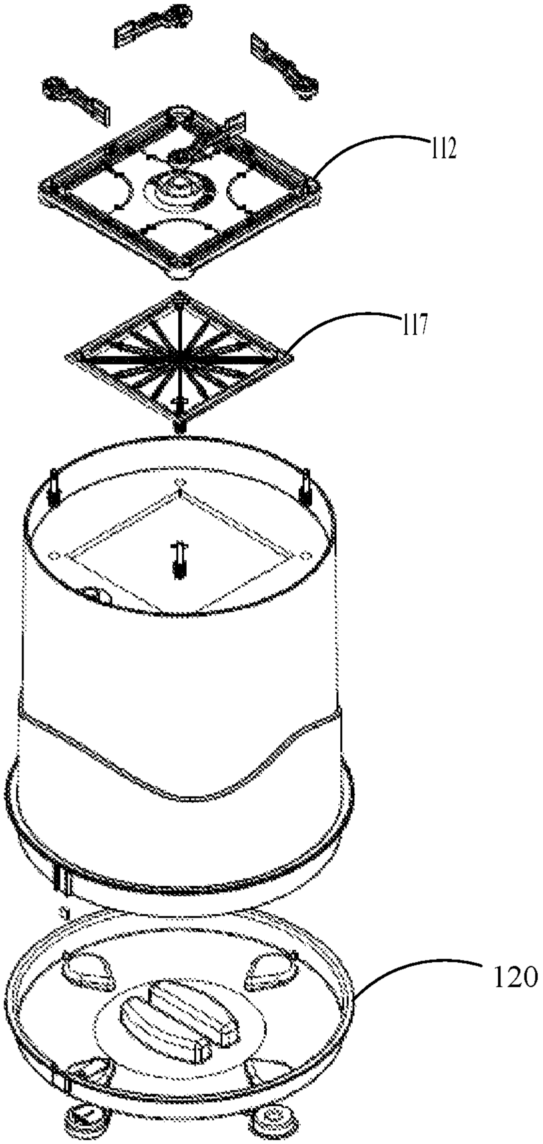
FIG. 6*b* is an exploded view of the top tank of a water dispenser according to one embodiment of the dispensers disclosed herein.

FIG. 6*a* is an exploded view of the top tank of a water dispenser according to one embodiment of the dispensers disclosed herein. The dispenser illustrated in FIG. 6*a* includes, inter alia, the top tank cover 120, the filter clamp 112 and the filter frame 117. FIG. 6*b* is an exploded view of the top tank of a water dispenser according to one embodiment of the dispensers disclosed herein. The dispenser illustrated in FIG. 6*b* includes, inter alia, the top tank cover 120, the filter clamp 112 and the filter frame 117.

Figure 7A:
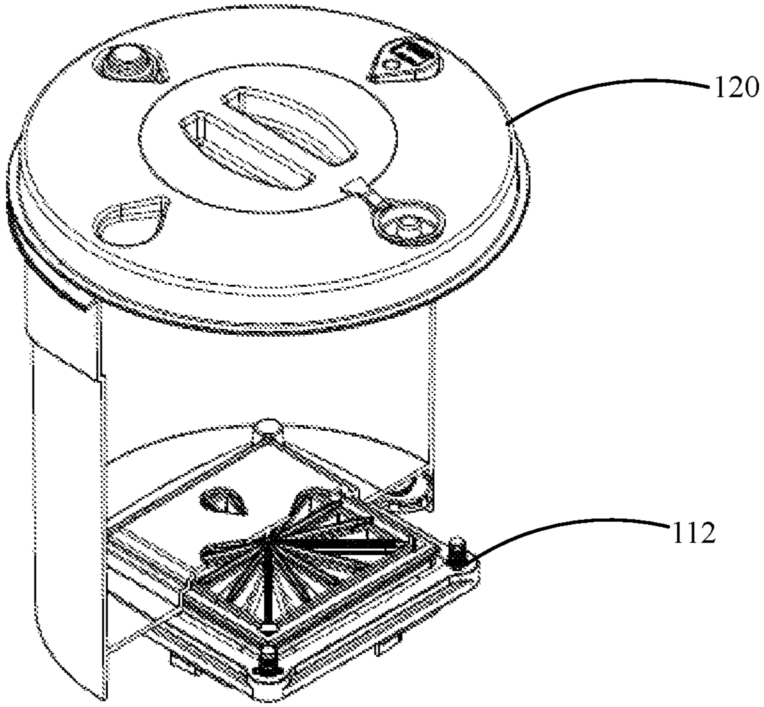
FIG. 7*a* is a cross sectional view of the top tank of a water dispenser according to one embodiment of the dispensers disclosed herein.
Figure 7B:
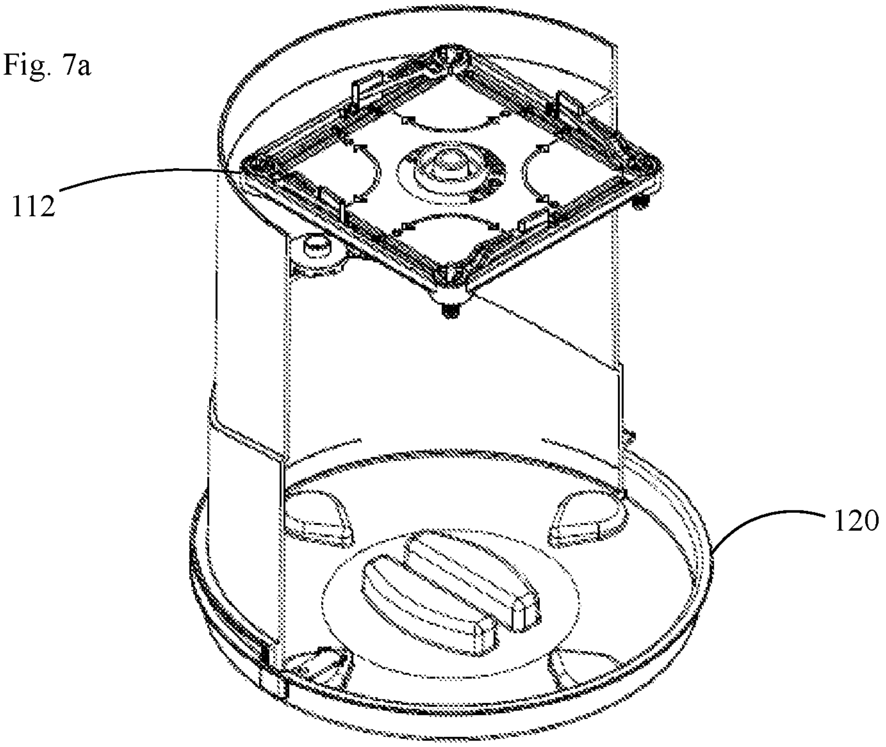
FIG. 7*b* is a cross sectional view of the top tank of a water dispenser according to one embodiment of the dispensers disclosed herein.

FIG. 7*a* is a cross sectional view of the top tank of a water dispenser according to one embodiment of the dispensers disclosed herein. The dispenser illustrated in FIG. 7*a* includes, inter alia, the top tank cover 120 and the filter clamp 112. FIG. 7*b* is a cross sectional view of the top tank of a water dispenser according to one embodiment of the dispensers disclosed herein. The dispenser illustrated in FIG. 7*b*, inter alia, includes the top tank cover 120 and the filter clamp 112.

Figure 8A:
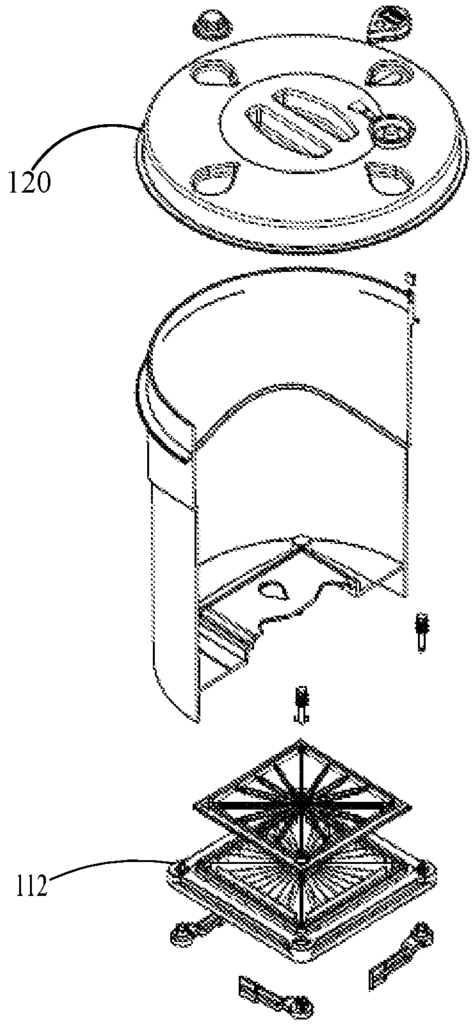
FIG. 8*a* is a cross sectional view of the top tank of a water dispenser according to one embodiment of the dispensers disclosed herein.
Figure 8B:
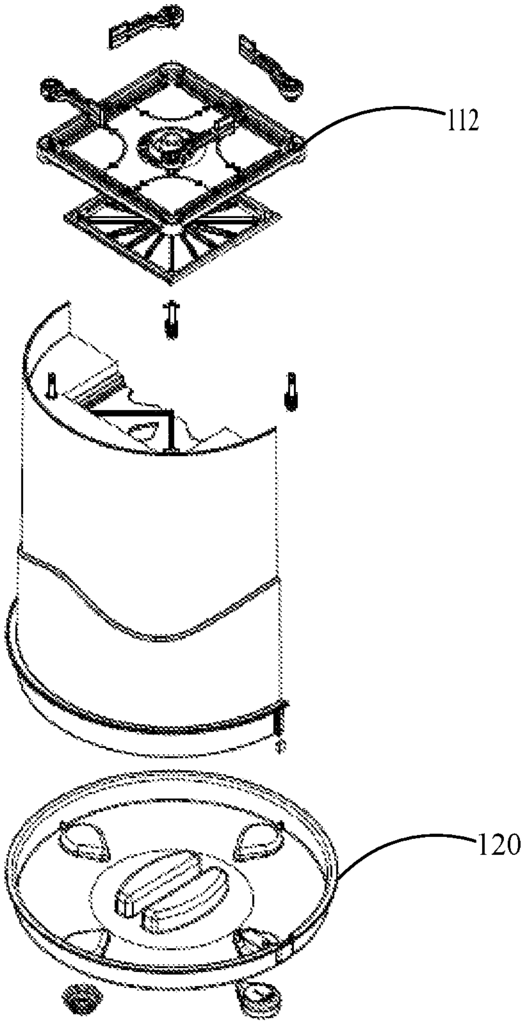
FIG. 8*b* is a cross sectional view of the top tank of a water dispenser according to one embodiment of the dispensers disclosed herein.

FIG. 8 is a cross sectional view of the top tank of a water dispenser according to one embodiment of the dispensers disclosed herein. The dispenser illustrated in FIG. 8*a* includes, inter alia, the top tank cover 120 and the filter clamp 112. FIG. 8*b* is a cross sectional view of the top tank of a water dispenser according to one embodiment of the dispensers disclosed herein. The dispenser illustrated in FIG. 8*b* includes, inter alia, the top tank cover 120 and the filter clamp 112.

Figure 9A:
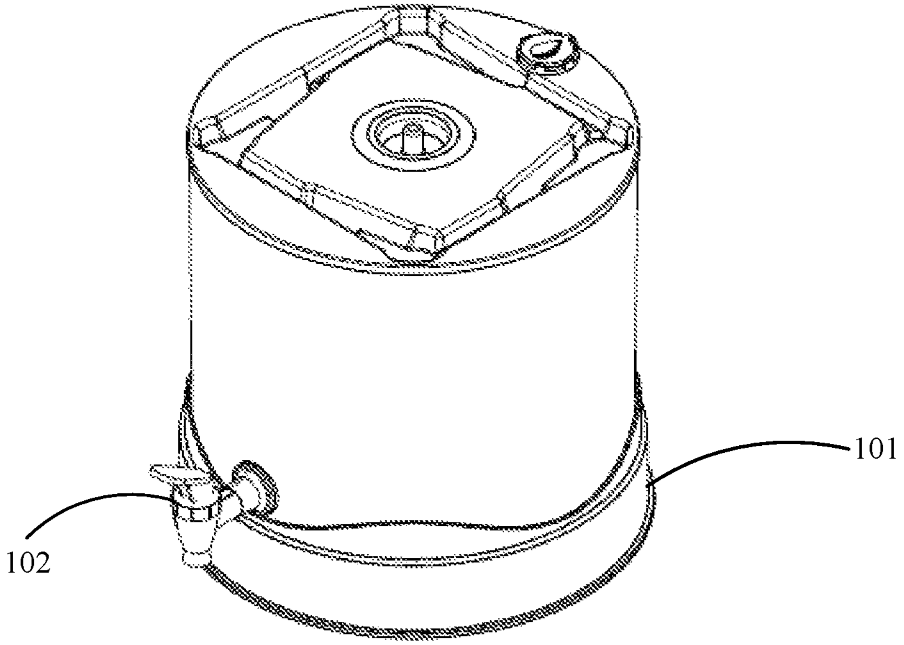
FIG. 9*a* is a partial disassembly of the bottom tank and stand of a water dispenser according to one embodiment of the dispensers disclosed herein.
Figure 9B:
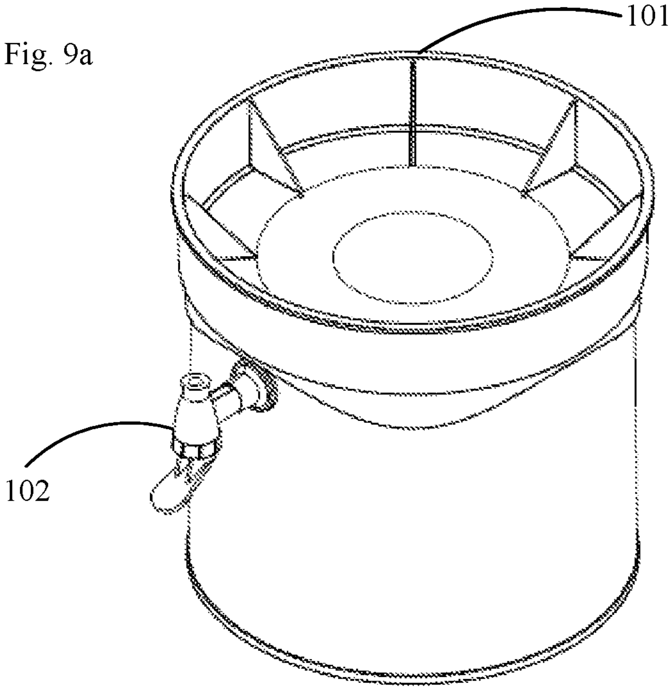
FIG. 9*b* is a partial disassembly of the bottom tank and stand of a water dispenser according to one embodiment of the dispensers disclosed herein.

FIG. 9*a* is a partial disassembly of the bottom tank and stand of a water dispenser according to one embodiment of the dispensers disclosed herein. The dispenser illustrated in FIG. 9*a* includes, inter alia, the spigot 102 and the base 101. FIG. 9*b* is a partial disassembly of the bottom tank and stand of a water dispenser according to one embodiment of the dispensers disclosed herein. The dispenser illustrated in FIG. 9*b* includes, inter alia, the spigot 102 and the base 101.

Figure 10A:
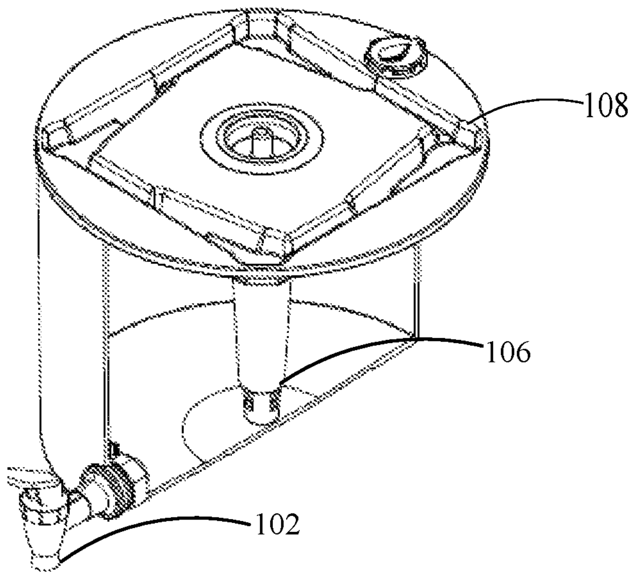
FIG. 10*a* is a cross sectional view of the bottom tank of a water dispenser according to one embodiment of the dispensers disclosed herein.
Figure 10B:
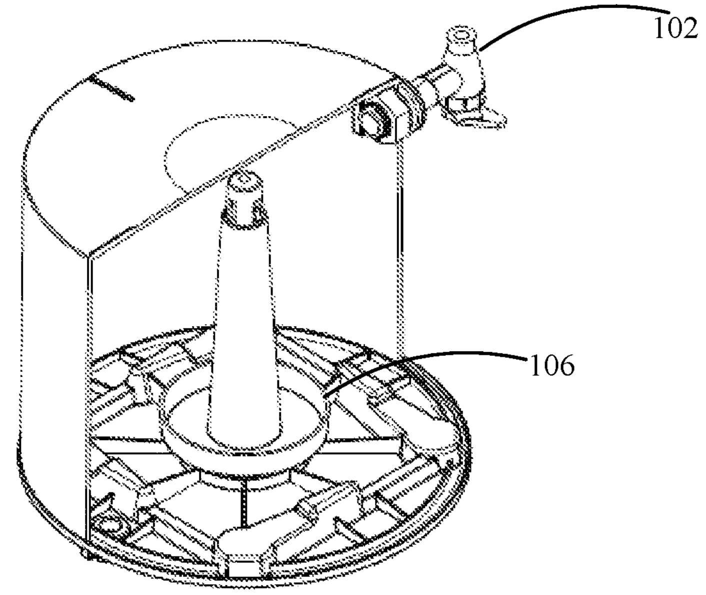
FIG. 10*b* is a cross sectional view of the bottom tank and stand of a water dispenser according to one embodiment of the dispensers disclosed herein.

FIG. 10*a* is a partial disassembly of the bottom tank and stand of a water dispenser according to one embodiment of the dispensers disclosed herein. The dispenser illustrated in FIG. 10*a* includes, inter alia, the base 101 and the float assembly mechanism 106. FIG. 10*b* is a partial disassembly of the bottom tank and stand of a water dispenser according to one embodiment of the dispensers disclosed herein. The dispenser illustrated in FIG. 10*b* includes, inter alia, the tank cover 108 and the float assembly mechanism 106.

FIG. 11 is a cross sectional view of the bottom tank of a water dispenser according to one embodiment of the dispensers disclosed herein. The dispenser illustrated in FIG. 11*a* includes, inter alia, the spigot 102, the tank cover 108 and the float assembly mechanism 106. FIG. 11*b* is a cross sectional view of the bottom tank of a water dispenser according to one embodiment of the dispensers disclosed herein. The dispenser illustrated in FIG. 11*b* includes, inter alia, the spigot 102 and the float assembly mechanism 106.

FIG. 12 is an exploded view of the bottom tank and stand of a water dispenser according to one embodiment of the dispensers disclosed herein. The dispenser illustrated in FIG. 12*a* includes, inter alia, the base 101 and the float assembly mechanism 106. FIG. 12*b* is an exploded view of the bottom tank and stand of a water dispenser according to one embodiment of the dispensers disclosed herein. The dispenser illustrated in FIG. 12*b* includes, inter alia, the base 101, the float assembly mechanism 106 and the tank cover.

Figure 13B:
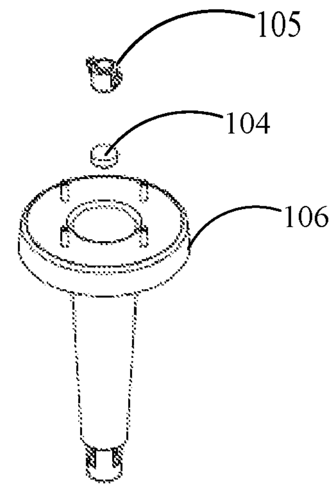
FIG. 13*b* includes various views of a float for use in a water dispenser according to one embodiment of the dispensers disclosed herein.
Figure 13C:
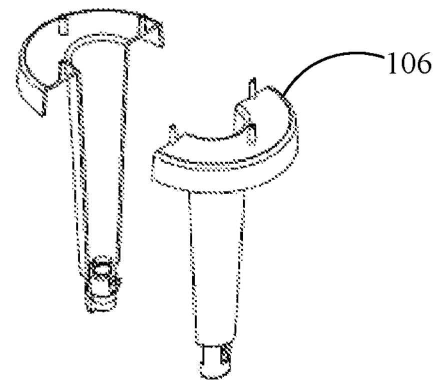
FIG. 13*c* includes various views of a float for use in a water dispenser according to one embodiment of the dispensers disclosed herein.
Figure 13A:
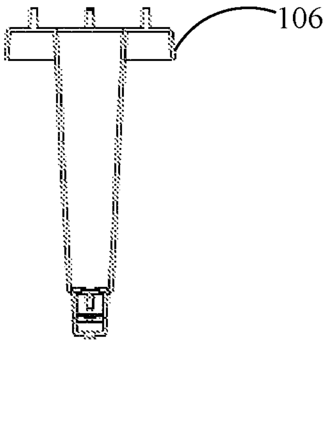
FIG. 13*a* includes various views of a float for use in a water dispenser according to one embodiment of the dispensers disclosed herein.

FIG. 13*a* includes a float system assembly for use in a water dispenser according to one embodiment of the dispensers disclosed herein. The float system assembly 106 in FIG. 13*a* is depicted as a cross sectional view. FIG. 13*b* includes, inter alia, a float system assembly for use in a water dispenser according to one embodiment of the dispensers disclosed herein. The float 106 in FIG. 13*b* is depicted as a top side overhead view. The float system assembly 106 in FIG. 13*b* further includes, inter alia, a float seal 104 may act as a seal for valve to control water level in the bottom tank 103 and a float valve 105 may include a valve for controlling water level in the bottom tank 103. FIG. 13*c* includes, inter alia, various views of a float system assembly for use in a water dispenser according to one embodiment of the dispensers disclosed herein. The float 106 in FIG. 13*c* is depicted as a top side split float system assembly view. The pegs at the top of the float assembly 106 align the assembly 106 with the seal 108 and allow the float to move vertically while resisting lateral or rotational movement. In this regard, the tank cover 108 may include the corresponding structure to receive the float and/or pegs.

Figure 14:
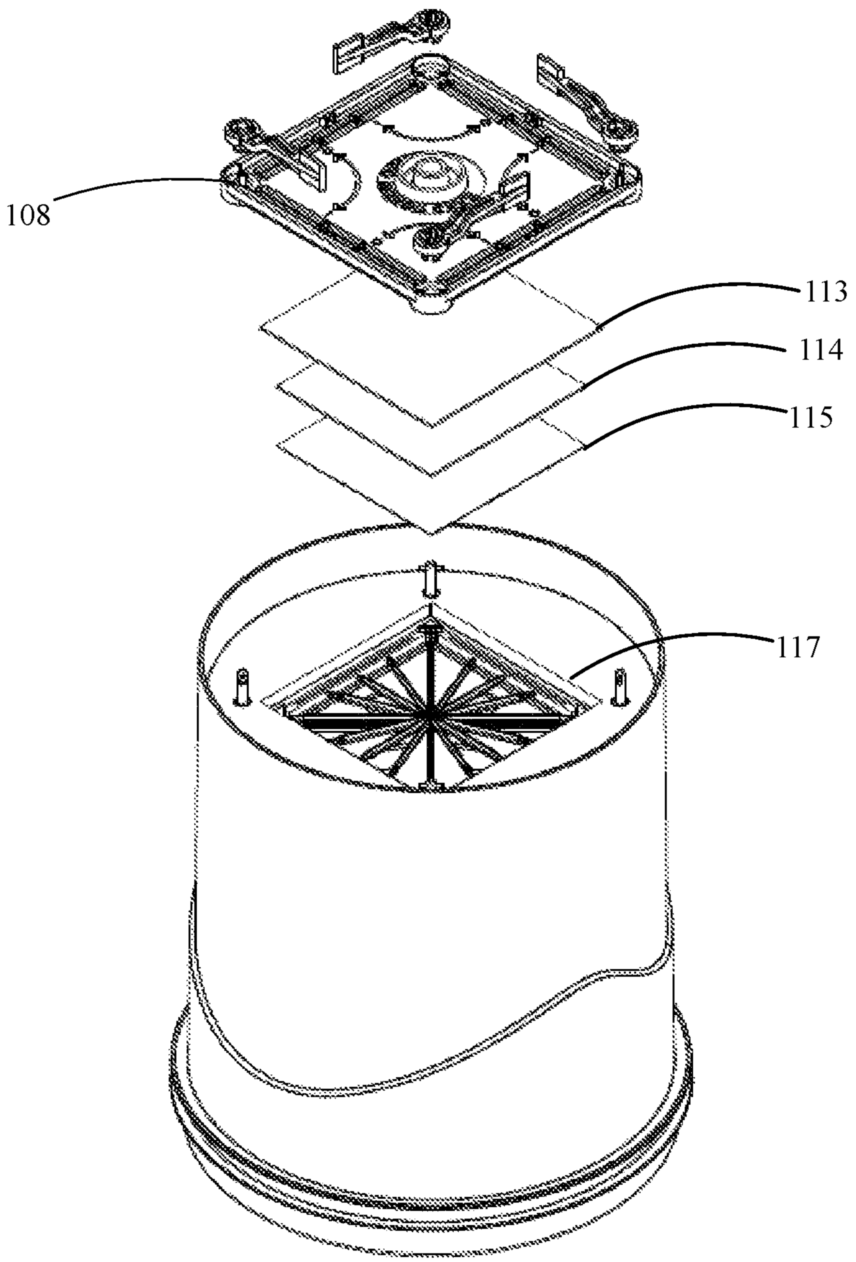
FIG. 14 is an exploded view of a filter assembly for use with a water dispenser according to one embodiment of the dispensers disclosed herein.

FIG. 14 is an exploded view of a filter assembly for use with a water dispenser according to one embodiment of the dispensers disclosed herein. The filter assembly of FIG. 14 for use with water dispenser 100 includes, inter alia, a tank cover 108, a nanotech filter 113, a carbon pre filter 114, a sediment prefilter 115 and a filter frame 117. FIG. 14 further includes filter clamp, cam handles, and fasteners.

Figure 15A:
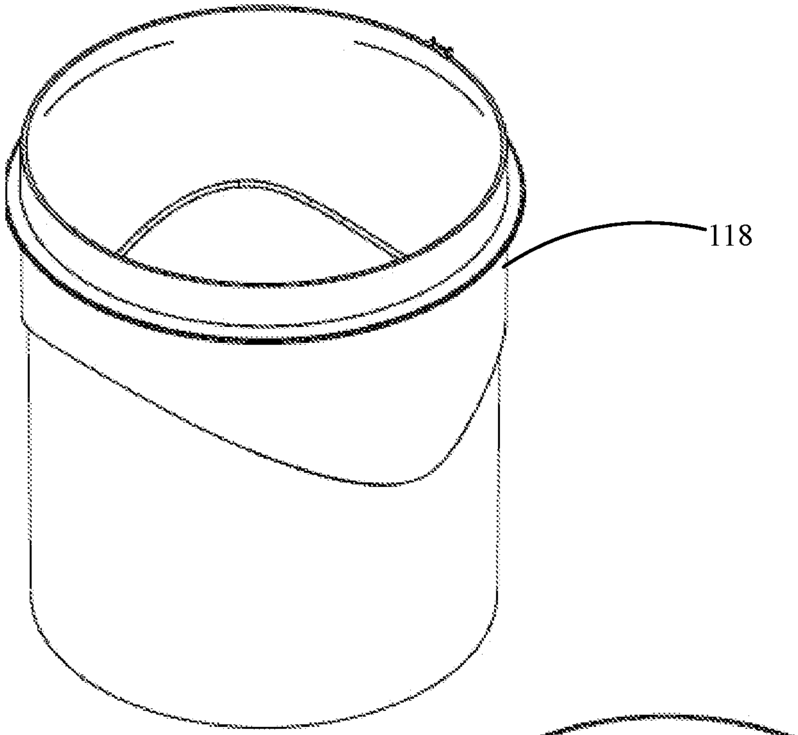
FIG. 15*a* is a partial disassembly of a water dispenser according to a second embodiment of the dispensers disclosed herein.
Figure 15B:
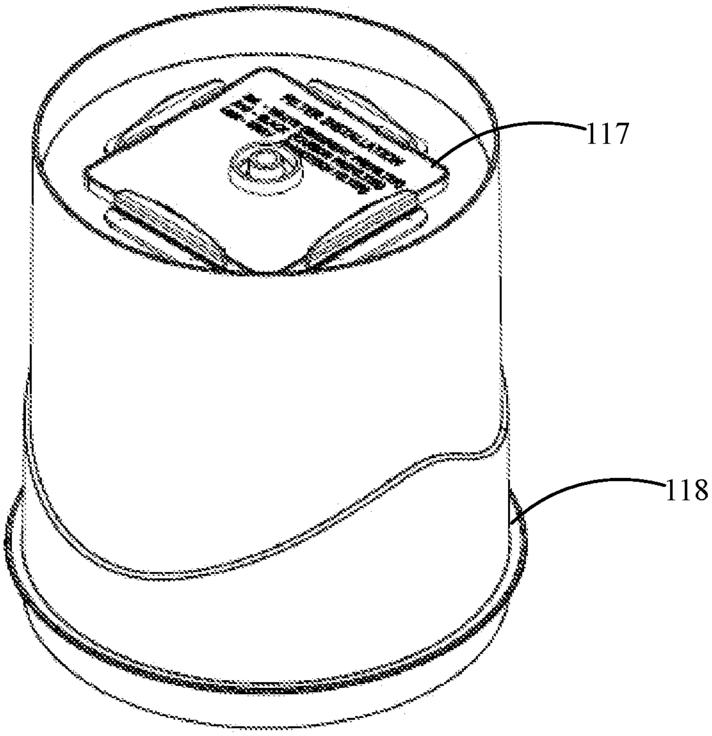
FIG. 15*b* is a partial disassembly of a water dispenser according to a second embodiment of the dispensers disclosed herein.

FIG. 15*a* is a partial disassembly of a water dispenser according to a second embodiment of the dispensers disclosed herein. The partial disassembly of the water dispenser 100 of FIG. 15*a* includes, inter alia, a top tank 118. FIG. 15*b* is a partial disassembly of a water dispenser according to a second embodiment of the dispensers disclosed herein. The partial disassembly of the water dispenser 100 of FIG. 15*b* includes, inter alia, a top tank 118 and a filter clamp 112 117 for filter installation. The filter clamp may be a square plate that mounts externally and holds the filters in place. The filter frame, in contrast, is a spider web like internal element that the filters mount on (not to be confused with the also spider web like inner surface of the Filter clamp).

Figure 16:
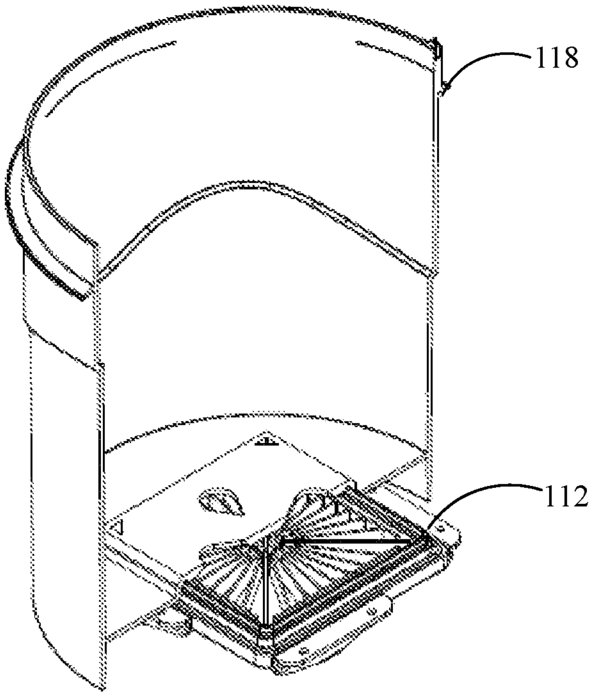
FIG. 16 is a cross sectional view of the top tank of a water dispenser according to a second embodiment of the dispensers disclosed herein.

FIG. 16 is an exploded view of a filter assembly for use with a water dispenser according to a second embodiment of the dispensers disclosed herein. The filter assembly of FIG. 16*a* includes, inter alia, a top tank 118 and a filter clamp 112. FIG. 16*b* is an exploded view of a filter assembly for use with a water dispenser according to a second embodiment of the dispensers disclosed herein. The filter assembly of FIG. 16 includes, inter alia, a top tank 118 and a filter clamp 117.

Figure 17:
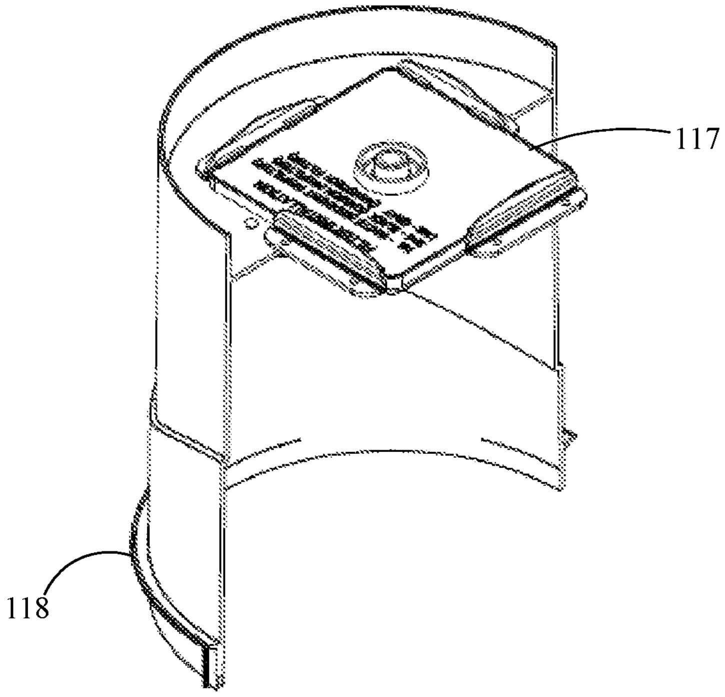
FIG. 17 is a cross sectional view of the top tank of a water dispenser according to a second embodiment of the dispensers disclosed herein.

FIG. 17 is a cross sectional view of the top tank of a water dispenser according to a second embodiment of the dispensers disclosed herein. The top tank 118 of the water dispenser in FIG. 17 includes, inter alia, a filter clamp 112 among other elements. FIG. 17 is a cross sectional view of the top tank of a water dispenser according to a second embodiment of the dispensers disclosed herein. The top tank 118 of the water dispenser in FIG. 17 includes, inter alia, a filter clamp 117 among other elements.

Figure 18A:
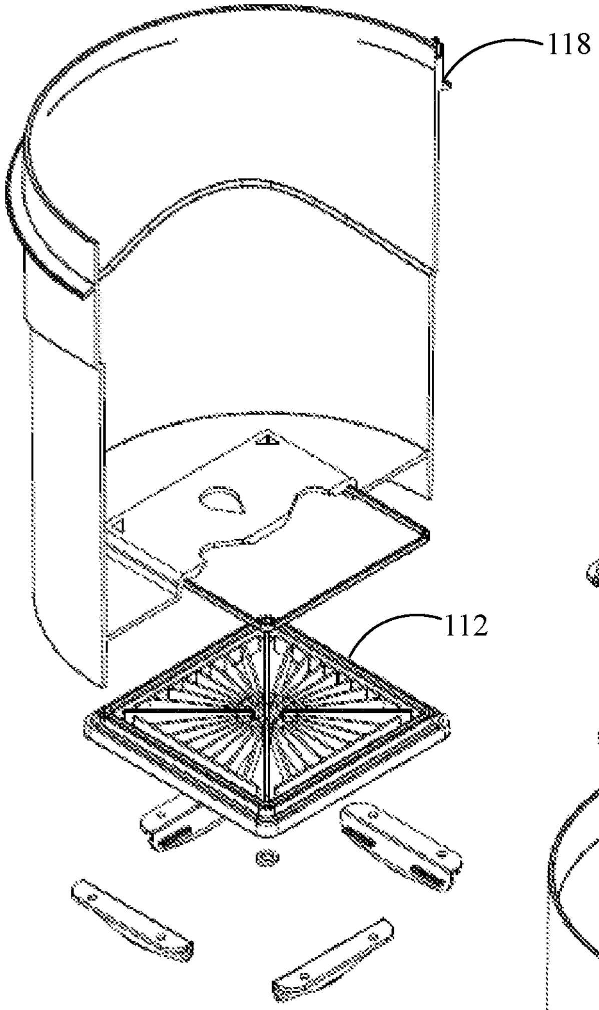
FIG. 18*a* is a cross sectional view of the top tank of a water dispenser according to a second embodiment of the dispensers disclosed herein.
Figure 18B:
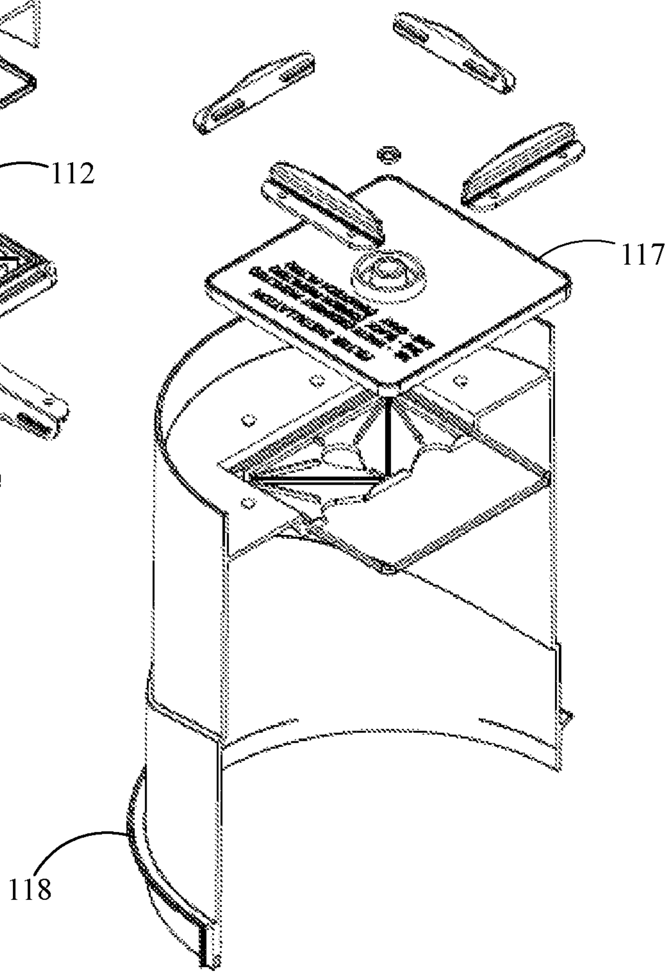
FIG. 18*b* is a cross sectional view of the top tank of a water dispenser according to a second embodiment of the dispensers disclosed herein.

FIG. 18*a* is a cross sectional view of the top tank of a water dispenser according to a second embodiment of the dispensers disclosed herein. The top tank 118 of the water dispenser in FIG. 1*a* includes, inter alia, a filter clamp 112 among other elements. FIG. 18*b* is a cross sectional view of the top tank of a water dispenser according to a second embodiment of the dispensers disclosed herein. The top tank 118 of the water dispenser in FIG. 18*b* includes, inter alia, a filter frame 117 among other elements.

Figure 19:
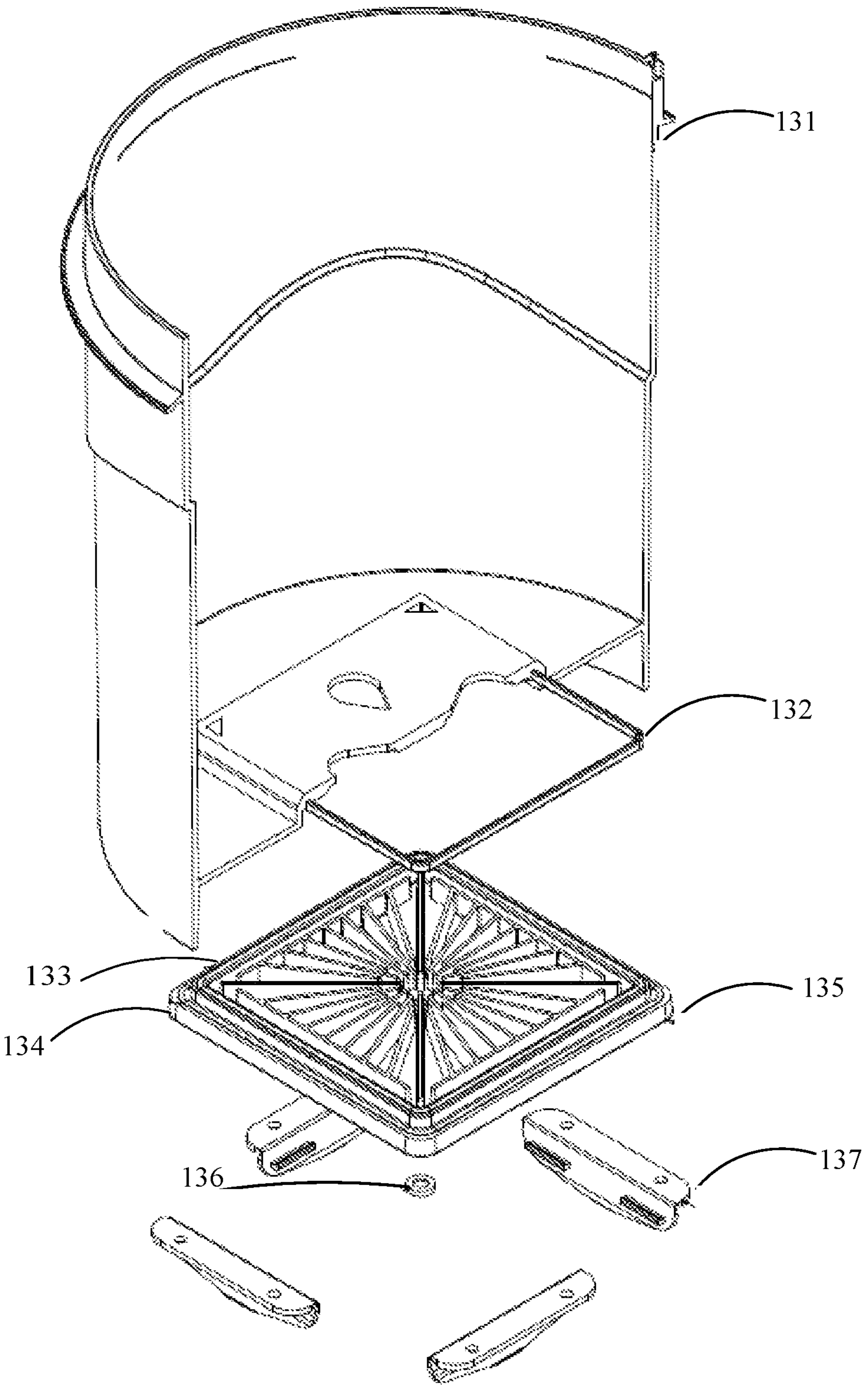
FIG. 19 is exploded view of the top tank of a water dispenser according to a second embodiment of the dispensers disclosed herein.

FIG. 19 is an exploded view of the top tank of a water dispenser according to a second embodiment of the dispensers disclosed herein. According to one embodiment, the exploded view of the top tank 118 of the water dispenser 100 of FIG. 19 includes a top tank 131 for storage of raw water for purification, a soft seal (Primary/Upper) 132 (Primary Soft Seal for conformal seal to Nanotech Filter (tank side)), a soft seal (Primary/Lower) 133 (Primary Soft Seal for conformal seal to Nanotech Filter (filter clamp side)), a soft seal (Secondary) 134 (Secondary Soft Seal for conformal seal to Top Tank), a filter clamp 135 which holds filters in place and provides clamping pressure for seals, a washer 136 which prevents leakage of clean water between top and bottom Tanks and clamp handles 137 which provide clamping pressure and locking of filter clamp 135.

While the foregoing invention has been described in some detail for purposes of clarity and understanding, it will be appreciated by one skilled in the art, from a reading of the disclosure, that various changes in form and detail can be made without departing from the true scope of the invention (e.g., changes to the shape of the top and/or bottom tanks from round to oval, rectangular, etc.; from rigid to collapsible forms).

The invention claimed is:

1. A water dispenser, comprising:

an upper chamber for receiving an unfiltered liquid, the upper chamber having an aperture at a bottom thereof for the liquid to be filtered to pass through the aperture;

a multiple-layer filtering assembly operably coupled to the upper chamber and in communication with the aperture for the unfiltered liquid to pass through a siphon tube in communication with the filter assembly;

a lower chamber operably coupled to the multiple-layer filtering assembly for receiving filtered liquid therefrom through the siphon tube; and a float assembly system operably coupled between the upper and lower chambers, the float assembly system including a float body configured to open and close a float valve depending on a level of the filtered liquid in the lower chamber, wherein the float assembly system lifts upon rising water levels in the lower chamber causing a float seal to contact the float valve and preventing overflow of the lower chamber.

2. The water dispenser of claim 1, wherein the float assembly system comprises the float valve that automatically opens when the water level in the lower chamber reaches a predetermined level.

3. The water dispenser of claim 1, wherein the float assembly system resumes water flow through the multiple-layer filtering assembly upon withdrawal of the filtered liquid from the lower chamber.

* * * * *